United States Patent
Vedantham et al.

(10) Patent No.: US 8,155,023 B2
(45) Date of Patent: Apr. 10, 2012

(54) MIMO WITH RESERVED SUBFRAMES IN PRIMARY AND SECONDARY BASE STATIONS

(75) Inventors: Ramanuja Vedantham, Dallas, TX (US); Shantanu Kangude, Dallas, TX (US); Sandeep Bhadra, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 257 days.

(21) Appl. No.: 12/564,040

(22) Filed: Sep. 21, 2009

(65) Prior Publication Data

US 2010/0080137 A1   Apr. 1, 2010

Related U.S. Application Data

(60) Provisional application No. 61/100,417, filed on Sep. 26, 2008.

(51) Int. Cl.
*H04J 3/00* (2006.01)
*H04L 12/26* (2006.01)

(52) U.S. Cl. .................................. 370/252; 370/336

(58) Field of Classification Search .................. 370/241, 370/252, 259, 260, 310, 328, 329, 336; 375/259, 375/260
See application file for complete search history.

(56) References Cited

U.S. PATENT DOCUMENTS

| | | | | |
|---|---|---|---|---|
| 5,822,696 | A * | 10/1998 | Bergkvist | 455/436 |
| 6,415,149 | B1 * | 7/2002 | Bevan et al. | 455/442 |
| 7,149,190 | B1 * | 12/2006 | Li et al. | 370/278 |
| 7,263,081 | B2 * | 8/2007 | Ishikawa | 370/331 |
| 2005/0120097 | A1 * | 6/2005 | Walton et al. | 709/220 |
| 2008/0037409 | A1 * | 2/2008 | Ogawa et al. | 370/201 |
| 2008/0285488 | A1 * | 11/2008 | Walton et al. | 370/280 |
| 2009/0042573 | A1 * | 2/2009 | Vedantham et al. | 455/436 |
| 2009/0168745 | A1 | 7/2009 | Ahmadi et al. | |
| 2009/0175214 | A1 | 7/2009 | Sfar et al. | |
| 2010/0067604 | A1 * | 3/2010 | Bhadra et al. | 375/267 |

FOREIGN PATENT DOCUMENTS

| | | |
|---|---|---|
| WO | WO 2008/096383 A1 | 10/2007 |
| WO | WO 2008/092890 A2 | 1/2008 |
| WO | WO 2008/132692 A2 | 4/2008 |

OTHER PUBLICATIONS

3GPP, "3rd Generation Partnership Project; Technical Specification Group Radio Access Network; Evolved Universal Terrestrial Access Network (E-UTRAN);" X2 Data Transport, 3GPP TS 36.424, Release 8, V8.2.0, Valbonne, France, Jun. 2008, pp. 1-8.

* cited by examiner

*Primary Examiner* — Chi Pham
*Assistant Examiner* — Robert Lopata
(74) *Attorney, Agent, or Firm* — Ronald O. Neerings; Wade James Brady, III; Frederick J. Telecky, Jr.

(57) ABSTRACT

Embodiments of the invention provide a method to efficiently enable Network MIMO for use in the downlink direction. An association is established between a primary NodeB in a first cell and a secondary NodeB in an adjacent second cell. A set of downlink transmission resources is reserved for use by both the primary NodeB and the secondary NodeB. A transport block is transmitted from the secondary NodeB simultaneously with the primary NodeB to a user equipment (UE) near the edge of the first cell in response to a schedule provided by the primary NodeB. A time instance of the reserved transmission resources is released by the secondary NodeB when no simultaneous transmission of a transport block is scheduled within a minimum time.

1 Claim, 6 Drawing Sheets

MIMO WITH RESERVED SUBFRAMES IN PRIMARY AND SECONDARY BASE STATIONS

CLAIM TO PRIORITY AND CROSS-REFERENCE TO RELATED APPLICATIONS

The present application claims priority to and incorporates by reference U.S. provisional application Ser. No. 61/100,417 filed on Sep. 26, 2008, entitled "Primary Secondary Associations for Improving Cell Edge Performance in Cellular Networks."

FIELD OF THE INVENTION

This invention generally relates to wireless cellular communication, and in particular to multiple input multiple output (MIMO) transmission in orthogonal and single carrier frequency division multiple access (OFDMA) (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. In general, NodeB hardware, when deployed, is fixed and stationary, while the UE hardware is portable.

In contrast to NodeB, the mobile UE can be portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Long Term Evolution (LTE) wireless networks, also known as Evolved Universal Terrestrial Radio Access (E-UTRA), are being standardized by the 3GPP working groups (WG). OFDMA and SC-FDMA (single carrier FDMA) access schemes were chosen for the down-link (DL) and up-link (UL) of E-UTRA, respectively. User Equipments (UE's) are time and frequency multiplexed on a physical uplink shared channel (PUSCH), and a fine time and frequency synchronization between UE's guarantees optimal intra-cell orthogonality. In case the UE is not UL synchronized, it uses a non-synchronized Physical Random Access Channel (PRACH), and the Base Station provides back some allocated UL resource and timing advance information to allow the UE to transmit on the PUSCH. The general operations of the physical channels are described in the EUTRA specifications, for example: "3$^{rd}$ Generation Partnership Project; Technical Specification Group Radio Access Network; Evolved Universal Terrestrial Radio Access (E-UTRA); Physical Channels and Modulation (TS 36.211 Release 8, or later)." As improvements of networks are made, the NodeB functionality evolves; a NodeB in the EUTRA environment is also referred to as an evolved NodeB (eNB).

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DMRS. Note that RS can also be transmitted for other purposes, such as channel sounding (SRS), synchronization, or any other purpose. Also note that Reference Signal (RS) can be sometimes called the pilot signal, or the training signal, or any other equivalent term.

The LTE physical layer (PHY) can optionally exploit multiple transceivers at both the base station and UE in order to enhance link robustness and increase data rates for the LTE downlink. Spatial diversity can be used to provide diversity against fading. In particular, maximal ratio combining (MRC) is used to enhance link reliability in challenging propagating conditions when signal strength is low and multipath conditions are challenging. Transmit diversity can be used to improve signal quality by transmitting the same data from multiple antennas to the receiver. Spatial multiplexing can be used to increase system capacity by carrying multiple data streams simultaneously from multiple antennas on the same frequency. Spatial multiplexing may be performed with one of the following cyclic delay diversity (CDD) precoding methods: zero-delay, small-delay, or large-delay CDD. Spatial multiplexing may also be referred to as MIMO (multiple input multiple output).

Three different types of physical channels are defined for the LTE downlink. One common characteristic of physical channels is that they all convey information from higher layers in the LTE stack. This is in contrast to physical signals, which convey information that is used exclusively within the PHY layer. Currently, the LTE DL physical channels are as follows: Physical Downlink Shared Channel (PDSCH), Physical Broadcast Channel (PBCH), Physical Multicast Channel (PMCH), Physical Control Format Indicator Channel (PCFICH), Physical Downlink Control Channel (PDCCH), and Physical Hybrid ARQ Indicator Channel (PHICH).

Control information feedback bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACK-NAK or just simply ACK, or any other equivalent term. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

It has been well established that the reliable performance of user equipment is dependent on the proximity with the base station (eNB) that it is connected with. Studies have shown that the media access control layer (MAC) HARQ error probability increases as the received signal to interference plus noise power ratio (SINR) decreases. UEs that are operating near the edge of a cell often have low SINR values. Several techniques are currently being considered to meet the high spectral requirement for advanced cellular networks, such as LTE-A. Network MIMO, is a concept where antennas from individual cells co-operate to provide diversity gain to UEs in the edge between the corresponding cells is a prominent technique in this respect. For example, this cooperation may be used to produce beam-forming to enhance transmission reliability.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Network MIMO in OFDM requires transmission in the same time-frequency resource from two eNBs that are spatially apart. This requires coordination between the participating eNBs. Embodiments of this invention provide an efficient coordination approach with minimal overhead. A communication paradigm and the protocol operations needed to effectively increase the through put of end-user data frames, sometimes referred to as "good put", of cell edge UEs in the downlink direction is described in more detail below.

Figure 1:
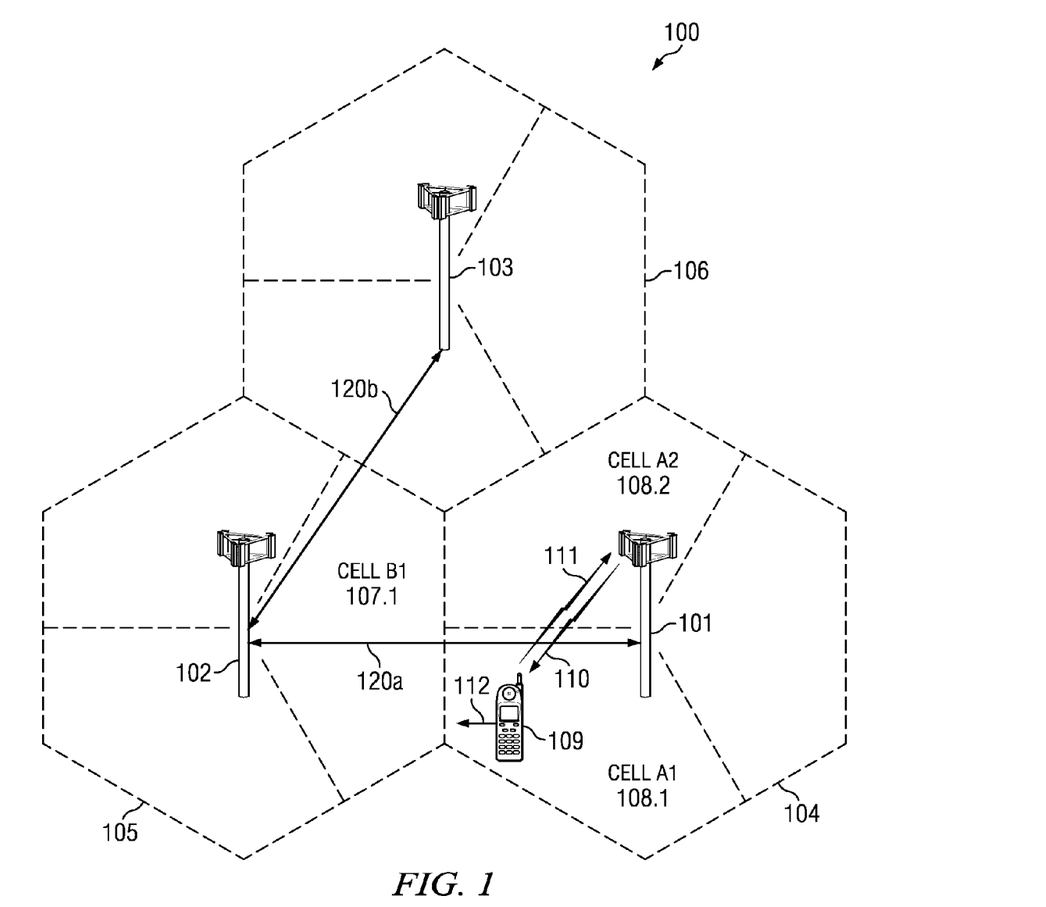
FIG. 1 is a pictorial of an illustrative telecommunications network that supports Network MIMO for downlink transmission.

FIG. 1 shows an exemplary wireless telecommunications network 100 that supports transmission and reception of Network MIMO signals, as described in more detail below. The illustrative telecommunications network includes base stations 101, 102, and 103, though in operation, a telecommunications network may include more base stations or fewer base stations. Each of base stations 101, 102, and 103 is operable over corresponding coverage areas 104, 105, and 106. Each base station's coverage area is further divided into cells. In the illustrated network, each base station's coverage area is divided into three cells. Handset or other UE 109 is shown in Cell A1 108.1, which is within coverage area 104 of base station 101. Base station 101 is transmitting to and receiving transmissions from UE 109. As UE 109 moves out of Cell A1 108.1, and into Cell B1 107.1, UE 109 may be "handed over" to base station 102. Assuming that UE 109 is synchronized with base station 101, UE 109 likely employs non-synchronized random access to initiate handover to base station 102. The distance over which a random access signal is recognizable by base station 102 is a factor in determining cell size.

When UE 109 is not up-link synchronized with base station 101, non-synchronized UE 109 employs non-synchronous random access (NSRA) to request allocation of up-link 111 time or frequency or code resources. If UE 109 has data ready for transmission, for example, traffic data, measurements report, tracking area update, etc., UE 109 can transmit a random access signal on up-link 111 to base station 101. The random access signal notifies base station 101 that UE 109 requires up-link resources to transmit the UE's data. Base station 101 responds by transmitting to UE 109, via down-link 110, a message containing the parameters of the resources allocated for UE 109 up-link and downlink transmission along with a possible timing error correction. After receiving the resource allocation and a possible timing adjustment message transmitted on down-link 110 by base station 101, UE 109 may adjust its transmit timing, to bring the UE 109 into synchronization with base station 101, and transmit the data on up-link 111 employing the allotted resources during the prescribed time interval.

The ability to exploit diversity gain for increasing the diversity gain while UE 109 is in a cell edge region, such as between cell A1 and B1, relies on the availability of a low-latency high-throughput link between the cooperating cells. For the case of cooperating cells belonging to the same eNB, such as cells 108.1, 108.2 in FIG. 1, this link is essentially the backplane connecting the various cells to the eNB. Comparable backplane designs in contemporary high speed routers provide link speeds of several hundred Mbps with latencies of the order of microseconds. This assures the availability of low-latency high-throughput links between cooperating intra-eNB cells. However, for truly leveraging the capabilities of Network MIMO, it is desirable that this minimal latency requirement is applicable to cooperating cells belonging to different eNBs, such as cells 107.1 and 108.1 in FIG. 1. In this disclosure, it is assumed that there is availability of such low-latency high-throughput links 120a,b between the participating eNBs. For example, an interface for point to point communication between two eNB is described in 3GPP TS 36.424, which specifies the standards for user data transport protocols and related signaling protocols to establish user plane transport bearers over the X2 interface. (ETSI TS 136.424 V8.5.0 (2009-04) Technical Specification, LTE; Evolved Universal Terrestrial Radio Access Network (E-UTRAN); X2 data transport (3GPP TS 36.424 version 8.5.0 Release 8, or later)). Other embodiments may use other types of communication protocol and physical links for a fast inter-eNB interface. The physical links may be T2 or T3 communication lines, optical links, microwave links, etc.

Figure 2A:
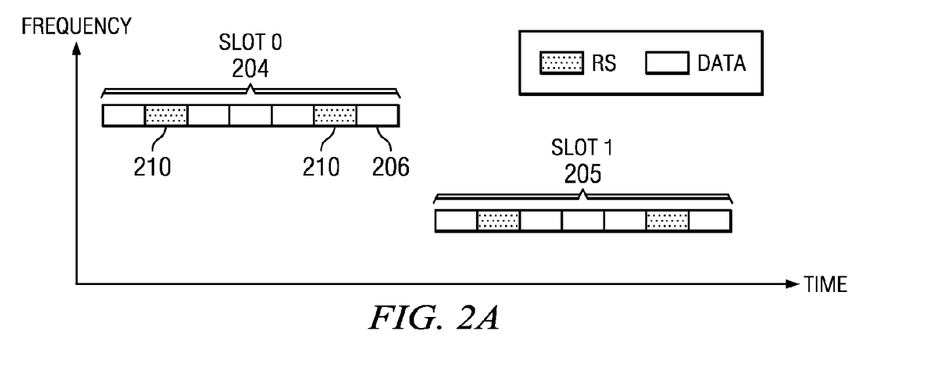
FIGS. 2A and 2B illustrate a frame structure used for downlink transmission within the network of FIG. 1.
Figure 2B:
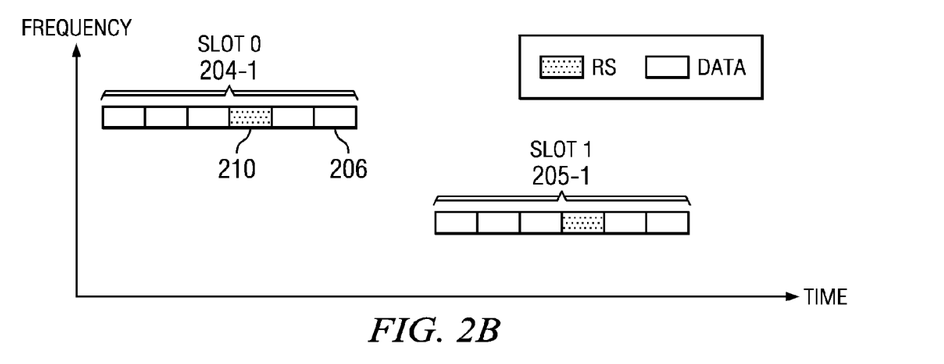

FIGS. 2A and 2B illustrate an exemplary frame structure used for transmission within the network of FIG. 1. Each frame contains several subframes. In turn, each subframe contains two slots 204, 205 that are transmitted on different frequency channels. Each slot contains a number of information carrying symbols, generally indicated at 206. A cyclic protection (CP) field is also appended to each symbol in order to improve reception integrity. In the current E-URTA standard, each slot contains seven symbols 206 if a normal CP length is used or six symbols 206 if an extended CP length is used. Other embodiments of the invention may provide other frame structures than the exemplary frame structure illustrated in FIGS. 2A-2B. FIG. 2A illustrates a subframe with two slots 204, 205 in the normal CP case. Two reference symbols (RS) 210 are included within each slot. FIG. 2B illustrates a subframe with two slots 204-1, 205-1 in the extended CP case. In this case, only one reference symbol 210 is included in each slot.

A reference signal is constructed using a reference signal sequence, typically by modulating a reference signal sequence. The reference signal sequence is known to both transmitter and receiver prior to any transmission. In some embodiments of the invention, a set of reference signal sequences includes CAZAC sequences and near —CAZAC sequences. Near —CAZAC is a term which designates sequences which are obtained using computer search methods, and whose properties approximate CAZAC properties. In some embodiments of the invention, CAZAC sequences are Zadoff-Chu sequences.

Figure 3:
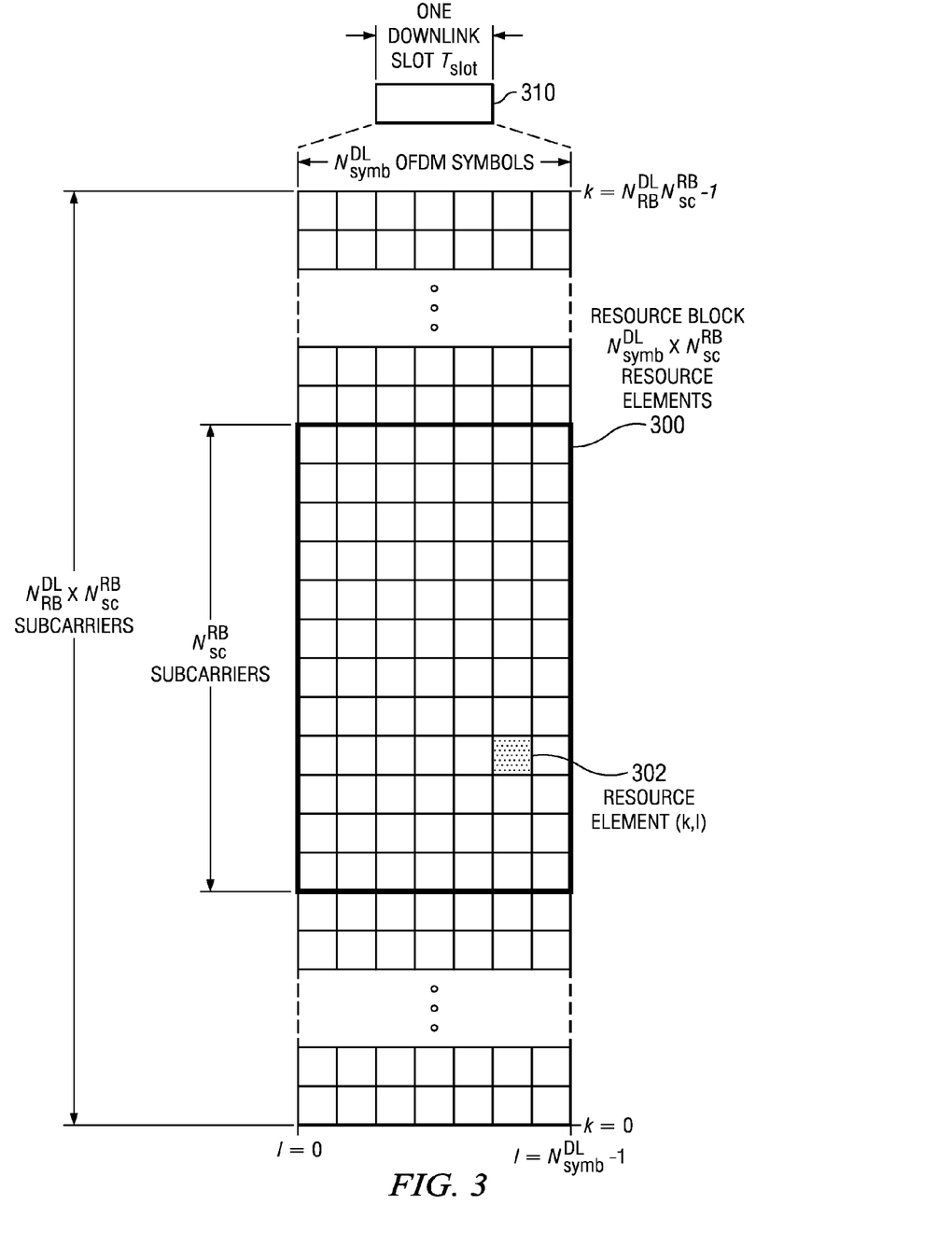
FIG. 3 illustrates an exemplary resource block used for transmission within the network of FIG. 1.

FIG. 3 illustrates an exemplary resource block 300 used for transmission within the network of FIG. 1. Resource blocks are used to describe the mapping of certain physical channels to resource elements 302. Physical and virtual resource blocks are defined. $N_{symb}^{DL}$ defines the number of OFDM symbols in a downlink slot. $N_{sc}^{RB}$ defines the resource block size in the frequency domain, expressed as a number of subcarriers, which are each 15 kHz. A physical resource block 300 is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 1. A physical resource block thus consists of $N_{symb}^{DL} \times N_{sc}^{RB}$ resource elements, corresponding to one slot 310 in the time domain and 180 kHz in the frequency domain.

Physical resource blocks are numbered from 0 to $N_{RB}^{DL}-1$ in the frequency domain, where $N_{RB}^{DL}$ is the downlink bandwidth configuration, expressed in multiples of $N_{sc}^{RB}$ Resource elements are indentified with a frequency-domain index k and time-domain index l. The relation between the physical resource block number $n_{PRB}$ in the frequency domain and resource elements (k,l) in a slot is given by:

TABLE 1

Physical resource blocks parameters.

$$n_{PRB} = \left\lfloor \frac{k}{N_{sc}^{RB}} \right\rfloor$$

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | 24 | 6 |
| | Δf = 7.5 kHz | | 3 |

The baseband signal representing a downlink physical channel is defined in terms of the following steps:
  scrambling of coded bits in each of the code words to be transmitted on a physical channel;
  modulation of scrambled bits to generate complex-valued modulation symbols;
  mapping of the complex-valued modulation symbols onto one or several transmission layers;
  precoding of the complex-valued modulation symbols on each layer for transmission on the antenna ports;
  mapping of complex-valued modulation symbols for each antenna port to resource elements; and
  generation of complex-valued time-domain OFDM signal for each antenna port.

A more detailed description of an embodiment of signal transmission is provided in 3GPP TS 36.211 "Physical Channels and Modulation", Release 8 or later. Other embodiments of signal transmission may utilize the benefits of network MIMO transmission, as described in more detail below.

Several embodiments are now described to efficiently enable Network MIMO in the downlink direction. In a first embodiment, a Primary eNB and one or more Secondary eNBs associated with the primary eNB are defined. The purpose of the association is to use the interface for coordination of control and data packets for Network MIMO. The association establishes a reserved resource block space (RBs) in both primary and secondary eNBs along with the reservation schedule in the secondary eNBs. A reserved RB space implies identical resource blocks in the primary and secondary eNBs.

Note that every eNB in a network can be a primary eNB and a secondary eNB for other associations. So in general, an eNB can have a primary reserved RB space (of size zero or more), and a secondary reserved RB space (of size zero or more) for each secondary association.

An example of the reservation schedule is as follows: the primary eNB reserves every odd subframe of resource blocks 2-4 with a specific secondary eNB. Alternatively, every even subframe may be reserved with a specific secondary eNB. In another embodiment, subframes from resource blocks other than 2-4 may be reserved with a specific secondary eNB. Typically, a primary eNB may reserve one set of resources with one secondary eNB and reserve different sets of resources with other secondary eNB. However, in some embodiments, a primary eNB may reserve the same resources with each secondary eNB to which it is associated. As described earlier with reference to FIG. 1, one embodiment of the fast inter-eNB interface 120a,b used for coordination between the eNBs would be the X2 interface. If a network deploys a different type of inter-eNB communication link, then that link would be used to propagate the reservation schedules between the associated eNB.

A control protocol is used to set up associations between primary and secondary eNBs for cell edge UEs. The primary eNB and secondary eNBs can be chosen statically or semi-statically. The associations may be sparse or full. For example, referring again to FIG. 1, there may be an association between eNB 101 and 102, but not between eNB 101 and 103, even though eNB 101, 103 are adjacent.

This association may be set up statically between all associated eNBs that are connected to each other via an inter-eNB interface. A static setup is valid for longer durations of time and may not change based on network conditions. Such a setup is simple, but may or may not be optimal.

Alternately, in another embodiment, the association may be set up semi-statically between the primary and secondary eNBs. Such an association may change based on network conditions such as average cell edge load (number of UEs at the cell edge on an average).

The primary eNB may determine a UE is near a cell edge based on time delay and/or power level of RS signals received from the UE, for example.

Figure 4:
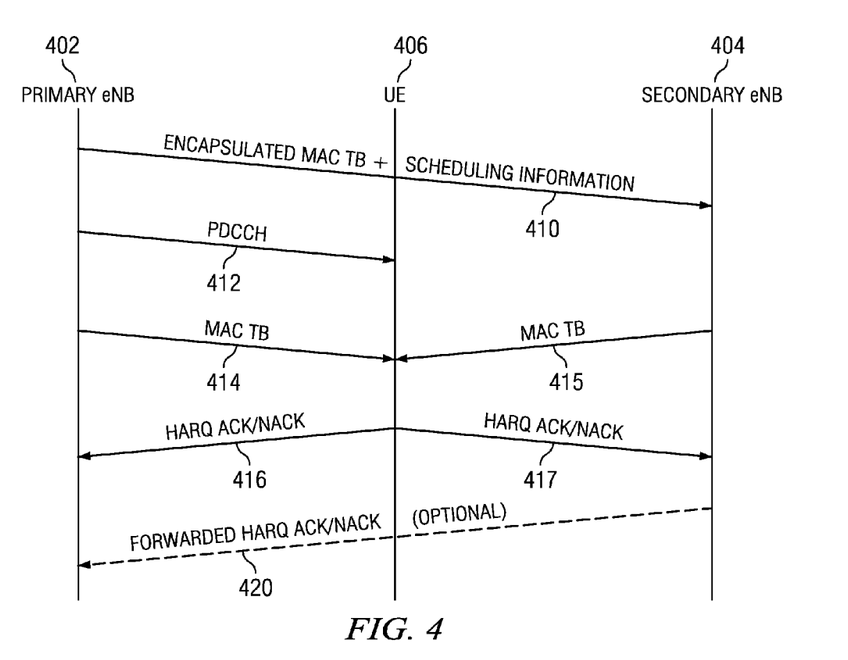
FIG. 4 is a trellis graph illustrating operation of a Network MIMO downlink transmission.

FIG. 4 is a trellis graph illustrating operation of a Network MIMO downlink transmission. The primary eNB 402 transmits 410 the MAC TBs intended for cell-edge UEs 406 to one or more secondary eNBs 404 encapsulated with a header that is specific to the association defined above, directly using the inter-eNB interface 120. The scheduling information that notifies when and using which reserved RBs the TB should be transmitted by the secondary eNB is also sent together within the above encapsulation. Note that the transmissions by the primary and secondary eNBs use the identical RBs.

The reserved RB space will be used by the secondary eNBs to transmit any media access control layer (MAC) transport block received over the fast inter-eNB interface from the primary eNB. When there is a MAC transport block (TB) to be transmitted to a cell edge UE from the primary eNB, primary eNB 402 creates the downlink allocation and signals 412 it to the UE on an appropriate PHY control channel (such as PDCCH). This allocation is constrained to be in the reserved RB space for this association during the set-up of the association. Once again, recall that the same reserved RBs are used at a given sub-frame by both the primary and secondary eNBs, thus the RB allocation needs to be identical at the primary and secondary eNBs.

The schedule/allocation on the PHY control channel intended for the cell-edge UE/s may only be decided by the primary eNB, and transmitted 412 to the UE. In that case, secondary eNBs only forwards 415 the MAC TBs in the resource blocks reserved according to the allocation created by the Primary eNB at the same time as the primary eNB transmits 414 the MAC TBs to the UE.

The primary eNB must create this schedule a sufficient minimum duration ahead of time to ensure that Secondary eNBs receive this encapsulated MAC TB(s) and their scheduling/resource allocation information sufficiently before the subframe allocated for transmission of the abovementioned MAC TB(s). Typically, a few subframes will be sufficient to allow correct operation. However, depending on the speed and bandwidth of the inter-NodeB interface, it may be necessary to allow as much as 10 ms (ten subframes) lead-time for scheduling each TB.

While the schedule is created this minimum time earlier, the transmission of this schedule on the PHY control channel notifying the UE may occur at a later sub-frame. This allows for the primary and secondary eNBs to simultaneously transmit 414, 415 the MAC TBs when there is data intended for a common cell edge UE, thereby achieving the goal of Network MIMO.

Figure 5:
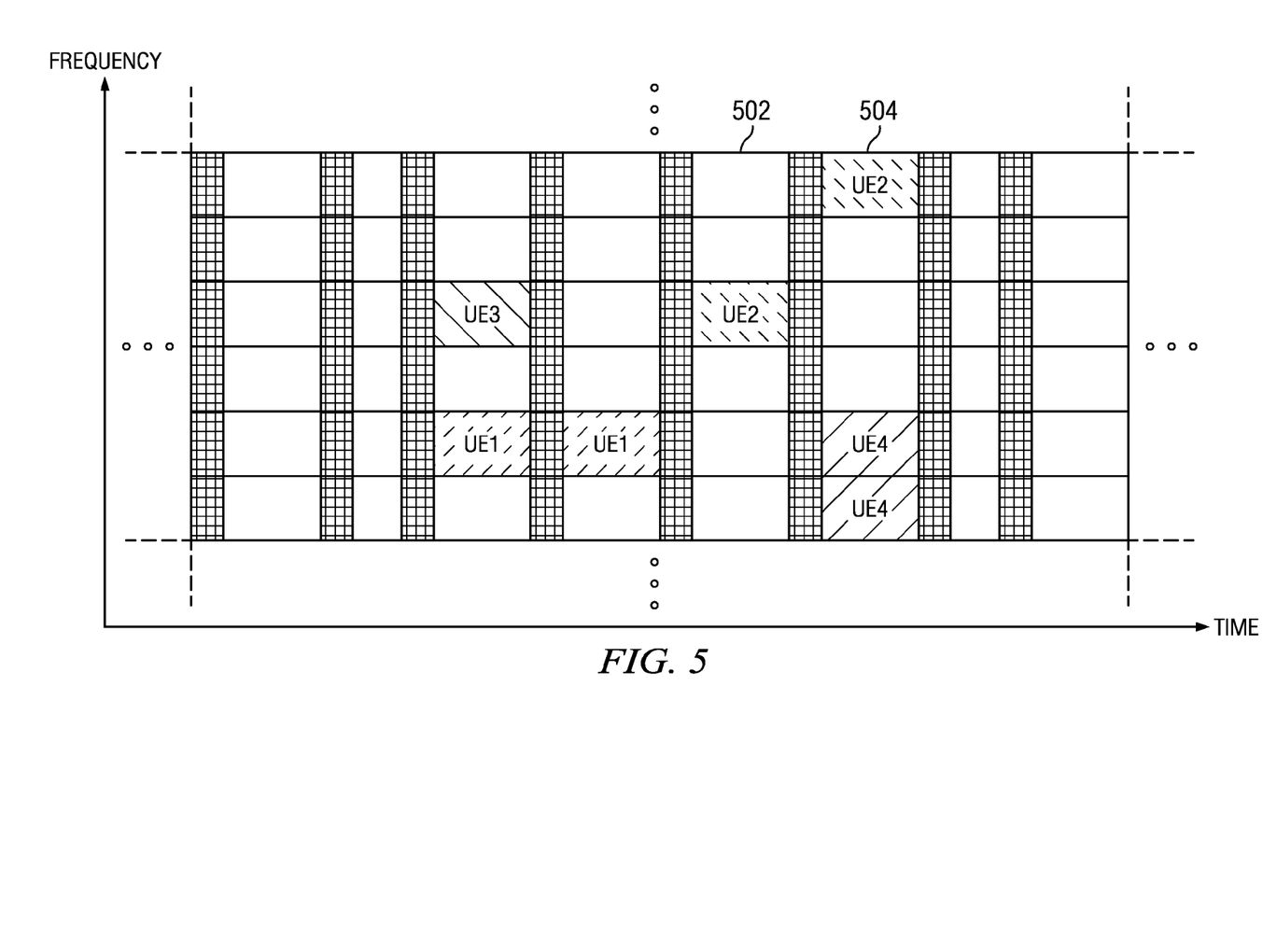
FIG. 5 is a plot illustrating a representative time-frequency resource assignment for downlink transmission to multiple UEs, in accordance with one embodiment of the invention.

FIG. 5 is a plot illustrating a representative time-frequency resource assignment for downlink transmission to multiple UEs. For example, in subframe 502 transmission to only one UE is scheduled, while in subframe 504, UE2 is assigned one subframe and UE4 is assigned two subframes.

In order for secondary eNB 404 to transmit primary eNB's 402 TB in a sub-frame it needs to receive the allocation and the encapsulated TB a certain time before, as discussed above. If there is no transmission scheduled in a particular reserved RB in a particular sub-frame before this time, the secondary eNB can schedule its own independent MAC TBs in that RB for this sub-frame.

Prior to the minimum duration, the secondary eNBs may not schedule any other non-Network MIMO related traffic in these reserved RBs. This is to ensure that RBs are available so that forwarded MAC TBs and the scheduling information, if any, can be transmitted by the secondary eNBs.

However, after the expiration of this fixed duration, the secondary eNB can dynamically schedule any other traffic on its own onto those reserved blocks. This will prevent any wastage of bandwidth in the secondary eNBs in the event that no MAC TB from the primary is scheduled in a particular reserved RB in the secondary.

The MAC Hybrid Automatic Repeat ReQuest (HARQ) acknowledgements (ACK) and negative acknowledgements (NACK) transmitted 416, 417 by the UE corresponding to the MAC TBs received from both primary and secondary eNB may be decoded by either the primary alone (or) by both primary and secondary eNB. When HARQ ACK/NACKs are decoded by the secondary, they may optionally be forwarded 420 to the primary eNB using the inter-eNB interface.

In either case, the secondary eNB may store the MAC TBs that were forwarded by the primary eNB for the purpose of retransmission in order to eliminate the need for the primary eNB to resend them to the secondary eNB when a retransmission is needed. However, the secondary eNB must coordinate any retransmission with the primary eNB rather than retransmitting autonomously. Any retransmission of MAC TBs will be initiated by the primary eNB, similar to a new MAC TB transmission procedure.

Enhancements Based on Traffic Requirements

In addition to the above embodiments, further enhancements may be performed to effectively use Network MIMO based on the quality of service (QoS) requirements for the application traffic type. The embodiments described above would effectively improve the reliability of the MAC TBs transmitted by the primary eNB, irrespective of the traffic type contained in the MAC TB.

At certain times, Network MIMO may be selectively used for certain types of traffic and not for certain other traffic types depending on whether sufficient resources/reserved RBs are reserved and available for Network MIMO for all traffic types. In one embodiment, delay sensitive traffic such as voice over internet protocol (VoIP) traffic intended for a cell edge UE is transmitted as a separate MAC TB by both primary and secondary eNB using Network MIMO, to improve the reliability and reduce retransmissions, if any. However, delay tolerant traffic such as content download over TCP/IP is scheduled on other sub-frames and transmitted only on the primary eNB without the benefit of Network MIMO.

The kind of service differentiation based on the traffic requirements can potentially allow for further efficient utilization of bandwidth resources in the secondary eNBs while still achieving the benefits of Network MIMO for delay-sensitive traffic.

Note that since the scheduler is within the primary eNB, this scheduler can determine which traffic type(s) can leverage Network MIMO, and simultaneously create the schedule for the traffic type(s) for which Network MIMO will be used.

Network MIMO is primarily used for voice traffic since the sporadic nature of voice traffic allows time for scheduling the simultaneous transmissions. Data traffic may be scheduled every subframe for an extended period which may tax the capability of the inter-eNB link to handle the scheduling. However, if the inter-eNB link has sufficient bandwidth, then Network MIMO may be used for data traffic also.

Figure 6:
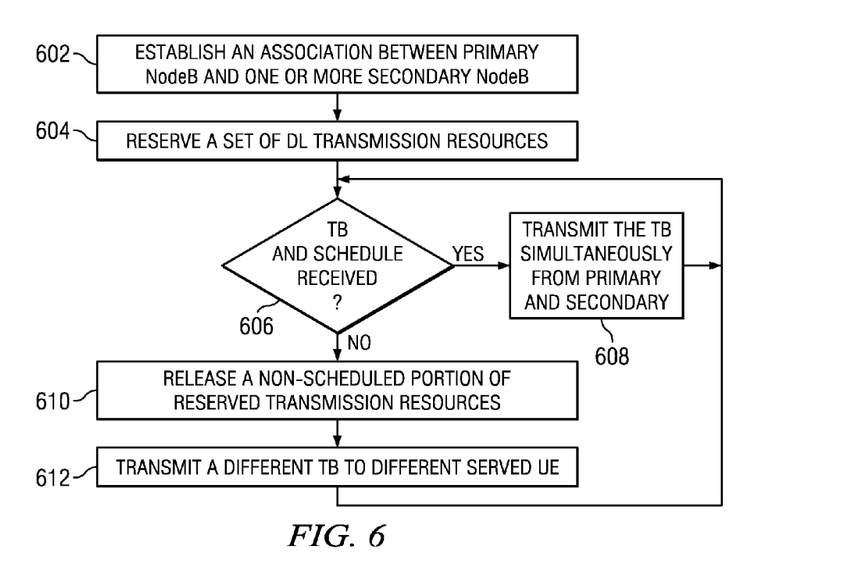
FIG. 6 is a flow diagram further illustrating operation of Network MIMO transmission.

FIG. 6 is a flow diagram further illustrating operation of Network MIMO transmission. An association is established 602 between a primary NodeB in a first cell and a secondary NodeB in an adjacent second cell, as described in more detail above. This association may be static or may be semi-static. For example, the primary NodeB may determine an average number of UE near a shared cell edge of the primary NodeB and the secondary NodeB. This may be done by evaluating power level of RS signals received from UE being served by the primary NodeB, for example. Based on the average number of UE near the shared cell edge of the primary NodeB, the primary NodeB may decide to establish a relation with a NodeB adjacent that edge of the cell if there are a large number of UE near that edge. Conversely, if there are only a few UE near the edge, then the NodeB may decide not to establish a relation with the adjacent NodeB.

Once a relationship is established with a secondary NodeB, a set of downlink transmission resources is reserved 604 for use by both the primary NodeB and the secondary NodeB. Information is passed between the primary NodeB and the secondary NodeB using a high speed inter-NodeB interface to identify the reserved resources. As described in more detail above, the reserved resources typically include several resource blocks for a continuing duration.

Each time the primary NodeB is ready to transmit a transport block to a UE near the cell edge adjacent the secondary NodeB, it schedules the transmission by selecting a slot from one of the reserved resource blocks. It then sends the transport block and scheduling information to the secondary NodeB. When the secondary NodeB receives 606 the scheduling info and TB, it transmits the transport block simultaneously with the primary NodeB to the user equipment (UE) near the edge of the first cell using the scheduled transmission resource.

In some embodiments, the primary NodeB may only schedule simultaneous transmission of TBs for traffic that requires a high quality of service, such as Voice over IP, for example.

At each time instant, if the secondary NodeB has not received 606 scheduling information from the primary NodeB for a resource block that is a minimal time in the future, then the secondary NodeB may release 610 the resource block from the reserved transmission resources. The secondary NodeB may then use the released resource block to transmit 612 a TB to a different UE that is being served within its cell coverage area.

System Examples

Figure 7:
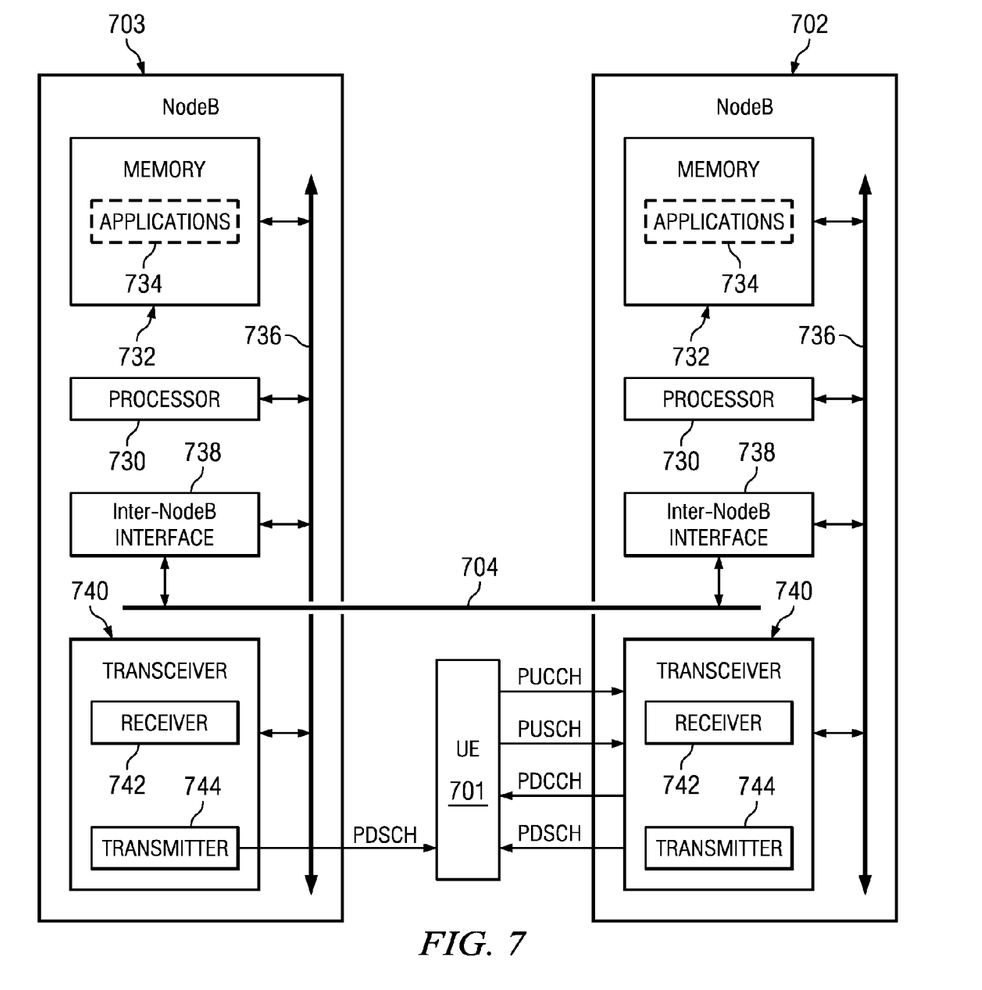
FIG. 7 is a block diagram illustrating a UE and interconnected NodeBs for the network system of FIG. 1.

FIG. 7 is a block diagram illustrating operation of a mobile UE 701 with interconnected primary eNB 702 and secondary eNB 703 in the network system of FIG. 1. The mobile UE device 701 may represent any of a variety of devices such as a server, a desktop computer, a laptop computer, a cellular phone, a Personal Digital Assistant (PDA), a smart phone or other electronic devices. In some embodiments, the electronic mobile UE device 701 communicates with the NodeB 702 based on a LTE or E-UTRAN protocol. Alternatively, another communication protocol now known or later developed can be used.

As shown, the mobile UE device 701 comprises a processor coupled to a memory and a Transceiver. The memory stores (software) applications for execution by the processor. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VoIP) tools, file browsers, firewalls, instant messaging, finance tools, games, word processors or other categories. Regardless of the exact nature of the applications, at least some of the applications may direct the mobile UE device 701 to transmit UL signals to the NodeB (base-station) 702 periodically or continuously via the transceiver. In at least some embodiments, the mobile UE device 701 identifies a Quality of Service (QoS) requirement when requesting an uplink resource from the NodeB 702. In some cases, the QoS requirement may be implicitly derived by the NodeB 702 from the type of traffic supported by the mobile UE device 701. As an example, VoIP and gaming applications often involve low-latency transmissions while High Throughput (HTP)/Hypertext Transmission Protocol (HTTP) traffic can involve high-latency uplink transmissions.

Transceiver includes uplink logic which may be implemented by execution of instructions that control the operation of the transceiver. Some of these instructions may be stored in memory and executed when needed by processor. As would be understood by one of skill in the art, the components of the uplink and downlink logic may involve the physical (PHY) layer and/or the Media Access Control (MAC) layer of the transceiver. The transceiver includes one or more receivers and one or more transmitters.

During transmission and reception of voice data or other application data, the transmitter sends ACKNAK information via the PUCCH link to the serving NodeB 702.

NodeB 702, 703 comprises a Processor 730 coupled to a memory 732, inter-NodeB interface circuitry 738, and a transceiver 740 via backplane bus 736. The memory stores applications 734 for execution by processor 730. The applications could comprise any known or future application useful for managing wireless communications. At least some of the applications 734 may direct the base-station to manage transmissions to or from the user device 701.

Transceiver 740 comprises a uplink and downlink resource managers, which enables the NodeB 702 to selectively allocate downlink PDSCH and uplink PUSCH resources to the user device 701. As would be understood by one of skill in the art, the components of the uplink and downlink resource managers may involve the physical (PHY) layer and/or the Media Access Control (MAC) layer of the transceiver 740. Transceiver 740 includes a receiver(s) 742 for receiving transmissions from various UE within range of the NodeB and transmitter(s) 744 for transmitting data and control information to the various UE within range of the NodeB.

The uplink and downlink resource managers execute instructions that control the operation of transceiver 740. Some of these instructions may be located in memory 732 and executed when needed on processor 730. The resource manager controls the transmission resources allocated to each UE that is being served by NodeB 702 and broadcasts control information via the physical downlink control channel PDCCH to the served UE 701.

Symbol processing logic performs demodulation using known techniques. ACKNAK information received from UE 701 is de-modulated using an agreed upon scheme.

As described in more detail above, NodeB 702 may establish an association with cell adjacent NodeB 703 and reserve a set of downlink transmission resources. This may be done is a static manner or in a semi-static manner by sending messages over inter-NodeB link 704 that is coupled to interface logic 738. Interface logic 738 may send and receive messages using the X2 interface, or another agreed upon message protocol. While transacting with UE 701, NodeB 702 may determine that TBs being sent to UE 701 are being interfered with or otherwise distorted, as discussed above. NodeB 702 may then transmit via inter-NodeB link 704 a schedule along with transport blocks to associated secondary NodeB 703 so that NodeB 702 and associated NodeB 703 may simultaneously transmit the same TB to the UE using the same transmission resource in Network MIMO fashion, as described in more detail above. For each time instance in which secondary NodeB 703 does not receive scheduling info within a minimum amount of time, secondary NodeB 703 may use the reserved resource to transmit TBs to UEs being served directly by NodeB 703. In this manner, use of transmission resources may be optimized while still providing network MIMO operation for cell edge UE to increase good put to these UE.

NodeB 702, 703 may be located in a same location and be interconnected via a backplane connection. In this case, scheduling messages may be sent via the backplane. While a single pair of NodeB is illustrated in FIG. 7, each primary NodeB may form an association with several adjacent NodeB and communicate using a backplane for nearby neighbors and point to point or other types of inter-NodeB links for distant neighbors.

Other Embodiments

While the invention has been described with reference to illustrative embodiments, this description is not intended to be construed in a limiting sense. Various other embodiments of the invention will be apparent to persons skilled in the art upon reference to this description. Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

While the invention has been described with reference to exemplary embodiments in the LTE environment, embodiments of the invention are not restricted to LTE networks and may be embodied in a variety of cellular networks with reference to the principles described herein.

Embodiments of this invention apply to any flavor of frequency division multiplex based transmission. Thus, the concept can easily be applied to: OFDMA, OFDM, DFT-spread OFDM, DFT-spread OFDMA, SC-OFDM, SC-OFDMA, MC-CDMA, and all other FDM-based transmission strategies.

A NodeB is generally a fixed station and may also be called a base transceiver system (BTS), an access point, an eNB, or some other terminology. A UE, also commonly referred to as terminal or mobile station, may be fixed or mobile and may be a wireless device, a cellular phone, a personal digital assistant (PDA), a wireless modem card, and so on.

While a single processor is illustrated in the exemplary NodeB of FIG. 7, other embodiments may include multiple processors that may embody multiple NodeB that are all coupled via a common backplane. Alternatively, multiple separate backplanes may be embodied in a single installation in generally known configurations. Memory 732 may be embodied in various known configurations that may include caches and/or multiple hierarchical levels.

As described in general above, embodiment of the invention may perform all tasks described herein such as NodeB associations, scheduling, formation of transmission signals, etc, using logic implemented by instructions executed on a processor. Another embodiment may have particular hardwired circuitry or other special purpose logic optimized for performing one or more to the tasks described herein.

An embodiment of the invention may include a system with a processor coupled to a computer readable medium in which a software program is stored that contains instructions that when executed by the processor perform the functions of modules and circuits described herein. The computer readable medium may be memory storage such as dynamic random access memory (DRAM), static RAM (SRAM), read only memory (ROM), Programmable ROM (PROM), erasable PROM (EPROM) or other similar types of memory. The computer readable media may also be in the form of magnetic, optical, semiconductor or other types of discs or other portable memory devices that can be used to distribute the software for downloading to a system for execution by a processor. The computer readable media may also be in the form of magnetic, optical, semiconductor or other types of disc unit coupled to a system that can store the software for downloading or for direct execution by a processor.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A process of spatial multiplexing in a wireless cellular communications network having a primary base station in a first cell, a secondary base station in a second cell adjacent the first cell, a low-latency, high throughput link between the primary base station and the secondary base station, and one user equipment in an edge region between the first cell and second cells, comprising:
   A. sending from the primary base station to the secondary base station over the link packets containing media access control layer transport block information for the one user equipment;
   B. establishing from the media access control layer transport block information identical reserved resource block spaces in the resource blocks in the primary and secondary base stations and a reservation schedule in the secondary base station for the one user equipment;
   C. reserving resource block spaces in the resource blocks in the secondary base station for more than one user equipment including reserving transmission to the one user equipment in one subcarrier frequency at one time and reserving transmission to another user equipment in another subcarrier frequency at the same time;
   D. transmitting from the primary base station to the user equipment PHY control channel information for the one user equipment;
   E. simultaneously transmitting from the primary and secondary base stations the media access control layer transport block information to the one user equipment;
   F. receiving from the one user equipment in the primary and secondary base stations one of an acknowledgement and no acknowledgement; and
   G. releasing the reserved resource block spaces in the secondary base station after a certain time if the secondary base station has not received scheduling information from the primary base station.

* * * * *